US008572211B2

(12) United States Patent
Carpio et al.

(10) Patent No.: US 8,572,211 B2
(45) Date of Patent: Oct. 29, 2013

(54) SYSTEM AND METHOD FOR EFFECTIVELY TRANSMITTING CONTENT ITEMS TO ELECTRONIC DEVICES

(75) Inventors: Fredrik Carpio, San Diego, CA (US); Milton Frazier, San Marcos, CA (US); Nikolaos Georgis, San Diego, CA (US)

(73) Assignees: Sony Corporation, Tokyo (JP); Sony Electronics Inc., Parkridge, NJ (US)

(*) Notice: Subject to any disclaimer, the term of this patent is extended or adjusted under 35 U.S.C. 154(b) by 466 days.

(21) Appl. No.: 12/217,808

(22) Filed: Jul. 9, 2008

(65) Prior Publication Data

US 2010/0011092 A1     Jan. 14, 2010

(51) Int. Cl.
*G06F 15/16* (2006.01)
*G06F 3/00* (2006.01)

(52) U.S. Cl.
USPC .................. 709/219; 715/745; 455/432.3

(58) Field of Classification Search
USPC ............... 709/203, 226, 229, 238, 206, 219; 705/14, 26; 715/526, 733, 745; 725/10, 725/74; 707/621, 5; 455/456.1, 436, 432.3; 370/277
See application file for complete search history.

(56) References Cited

U.S. PATENT DOCUMENTS

| | | | | |
|---|---|---|---|---|
| 6,041,359 A * | 3/2000 | Birdwell | | 709/238 |
| 6,438,579 B1 * | 8/2002 | Hosken | | 709/203 |
| 6,965,770 B2 * | 11/2005 | Walsh et al. | | 455/426.1 |
| 8,027,954 B2 * | 9/2011 | Malcolm | | 707/621 |
| 2002/0112035 A1 * | 8/2002 | Carey et al. | | 709/219 |
| 2002/0178440 A1 * | 11/2002 | Agnihotri et al. | | 725/10 |
| 2004/0203886 A1 * | 10/2004 | Rohles et al. | | 455/456.1 |
| 2007/0022446 A1 * | 1/2007 | Arseneau et al. | | 725/74 |
| 2007/0038931 A1 * | 2/2007 | Allaire et al. | | 715/526 |
| 2007/0123258 A1 * | 5/2007 | Sawyer | | 455/436 |
| 2008/0056256 A1 * | 3/2008 | Cinghita et al. | | 370/390 |
| 2008/0089251 A1 * | 4/2008 | Gallego et al. | | 370/277 |
| 2008/0134043 A1 * | 6/2008 | Georgis et al. | | 715/733 |
| 2008/0208985 A1 * | 8/2008 | Georgis et al. | | 709/206 |
| 2008/0228587 A1 * | 9/2008 | Slaney et al. | | 705/26 |
| 2008/0313033 A1 * | 12/2008 | Guo et al. | | 705/14 |
| 2009/0006368 A1 * | 1/2009 | Mei et al. | | 707/5 |

* cited by examiner

*Primary Examiner* — Jungwon Chang
(74) *Attorney, Agent, or Firm* — Sony Corporation

(57) ABSTRACT

A system and method for effectively transmitting content items to electronic devices includes a content server that is configured to access and store various types of content information. A recommendation engine of the content server analyzes network statistics and client profiles to identify appropriate content items for device users of the electronic devices. A transmitter receives the targeted content items from the content server, and responsively provides the content items to the electronic devices by broadcasting the content items over a unidirectional telecommunications link.

19 Claims, 11 Drawing Sheets

SYSTEM AND METHOD FOR EFFECTIVELY TRANSMITTING CONTENT ITEMS TO ELECTRONIC DEVICES

BACKGROUND SECTION

1. Field of the Invention

This invention relates generally to techniques for managing electronic information, and relates more particularly to a system and method for effectively transmitting content items to electronic devices.

2. Description of the Background Art

Implementing effective methods for providing appropriate electronic content is a significant consideration for designers and manufacturers of contemporary electronic devices. However, effectively providing content utilized by electronic devices may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced data management operations may provide additional benefits to a system user, but may also place increased demands on the control and management of various system components. For example, an enhanced electronic network device that effectively manages electronic content may benefit from an effective implementation because of the large amount and complexity of the digital data involved.

Due to growing demands on system resources and substantially increasing data magnitudes, it is apparent that developing new techniques for providing content to electronic devices is a matter of concern for related electronic technologies. Therefore, for all the foregoing reasons, developing effective techniques for providing content remains a significant consideration for designers, manufacturers, and users of contemporary electronic devices.

SUMMARY

In accordance with the present invention, a system for effectively transmitting content items to electronic devices is disclosed. In one embodiment, a content distribution system advantageously supports a content transmission procedure that automatically provides various types of appropriate content items for utilization by a device users of the electronic devices. For example, the content items may include, but are not limited to, relevant information such as current news, weather, traffic, sports, financial information, audio/video clips, program guide information, and information from Internet websites.

In certain embodiments, the content server analyzes network statistics and client profiles corresponding to users of computers in a distributed electronic network (such as the Internet). The content server then automatically provides recommended content items to a transmitter which responsively transmits the content items to one or more electronic devices via a unidirectional transmission link. A device user of an electronic device may thus utilize the content items to simulate an Internet experience without having an actual bi-directional Internet connection.

In certain embodiments, the content server collects various specified types of network statistics corresponding to users of computers in the electronic network. For example, in certain embodiments, the network statistics may include, but are not limited to, network browsing statistics. The content server also compiles client profiles corresponding to device users of the electronic devices by utilizing any effective techniques. For example, the client profiles may include information manually supplied by the device users. The content server may also automatically populate the client profiles by analyzing any appropriate information (including the foregoing network statistics).

A recommendation engine of the content server analyzes relevant data (potentially including the network statistics and the client profiles) by utilizing any effective techniques. The recommendation engine then generates one or more recommendation lists of appropriate content items for transmitting to targeted ones of the electronic devices. The content server accesses and sends the recommended content items to the transmitter which performs a unidirectional broadcast procedure to transmit the received content items to one or more of the electronic devices.

Content managers of the electronic devices may determine whether to accept the received content items according to any appropriate criteria. For example, device users may specify certain acceptance criteria by programming corresponding user preferences. If the content managers accept the transmitted content items, then the electronic devices may locally store the content items for appropriate utilization by device users. The content managers may also determine whether one or more locally-stored content items are obsolete or no longer required. The content managers may then automatically delete any unwanted or out-dated content items from local memory. For at least the foregoing reasons, the present invention therefore provides an improved system and method for effectively transmitting content items to electronic devices.

DETAILED DESCRIPTION

The present invention relates to an improvement in electronic information management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for effectively transmitting content items to electronic devices, and includes a content server that is configured to access and store various types of content information. A recommendation engine of the content server analyzes network statistics and client profiles to identify appropriate content items for device users of the electronic devices. A transmitter receives the targeted content items from the content server, and responsively provides the content items to the electronic devices by broadcasting the content items over a unidirectional telecommunications link.

Figure 1:
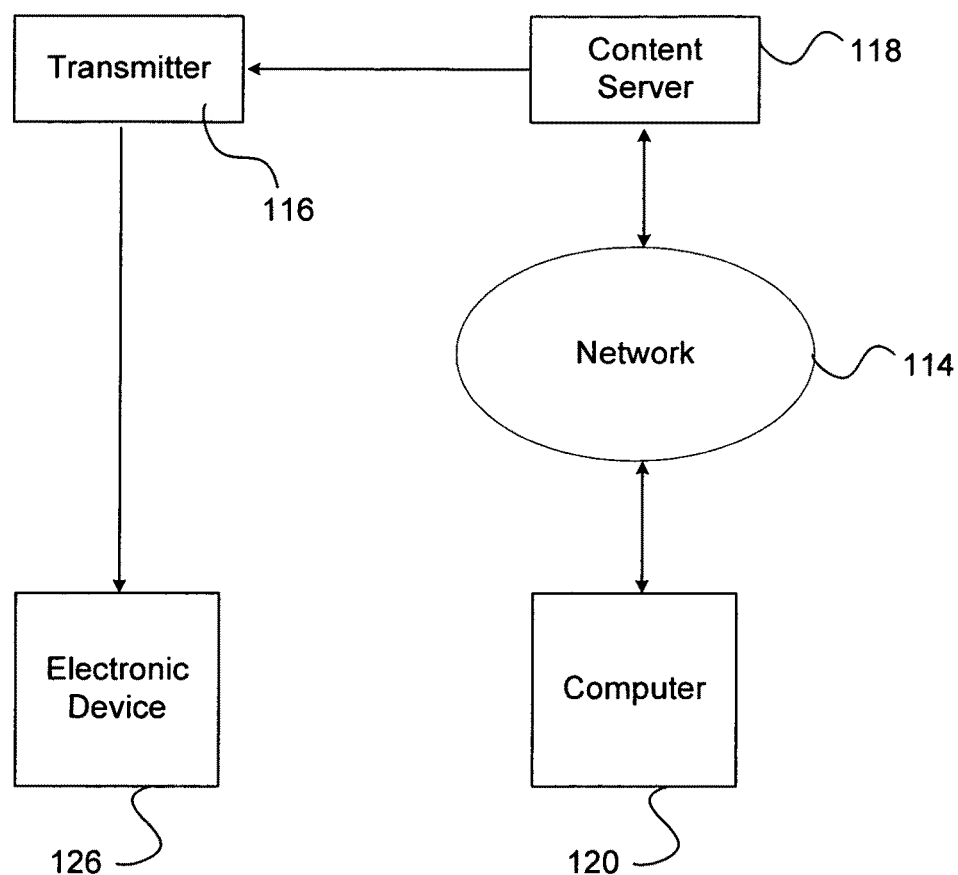
FIG. 1 is a block diagram of a content distribution system, in accordance with one embodiment of the present invention.

Referring now to FIG. 1, a block diagram of a content distribution system 110 is shown, in accordance with one embodiment of the present invention. In the FIG. 1 embodiment, content distribution system 110 may include, but is not limited to, an electronic network 114, a content server 118, a transmitter 116, an electronic device 126, and a computer 120. In alternate embodiments, content distribution system 110 may be implemented by utilizing components and configurations in addition to, or instead of, certain of those components and configurations discussed in conjunction with the FIG. 1 embodiment. For example, for purposes of illustration, a single electronic device 126 is shown in FIG. 1. However, in actual practice, principles of the disclosed invention may readily be performed with any number of different electronic devices 126. Furthermore, network 114 typically includes a substantial number of additional computers 120.

In accordance with the present invention, content distribution system 110 advantageously supports a content transmission procedure that automatically provides various types of appropriate content items for utilization by a device user of electronic device 126. For example, the content items may include, but are not limited to, relevant information such as current news, weather, traffic, sports, financial information, audio/video clips, program guide information, and information from Internet websites.

In certain embodiments, content server 118 analyzes network statistics and client profiles corresponding to users of computers 120 in network 114. Content server 118 then automatically provides recommended content items to transmitter 116 which responsively transmits the content items to one or more electronic devices 126 via a unidirectional transmission link. A device user of electronic device 126 may thus utilize the content items to simulate an Internet-like experience without having an actual bi-directional Internet connection.

Electronic device 120 may therefore conserve significant operating power through performing only receive functions, and by not having to perform power-consuming transmit functions. Furthermore, in physical locations where a wireless connection is not adequate for satisfactory signal reception, content items previously received by electronic device 126 may still be utilized by the device user. In addition, a single transmission from transmitter 116 may efficiently be utilized to transfer multiple appropriate content items to many different electronic devices 126 simultaneously. In certain embodiments, transmitter 116 may broadcast different sets of content items on different transmission channels. Further details regarding the implementation and utilization of the FIG. 1 content distribution system 110 are discussed below in conjunction with FIGS. 2-11.

Figure 2:
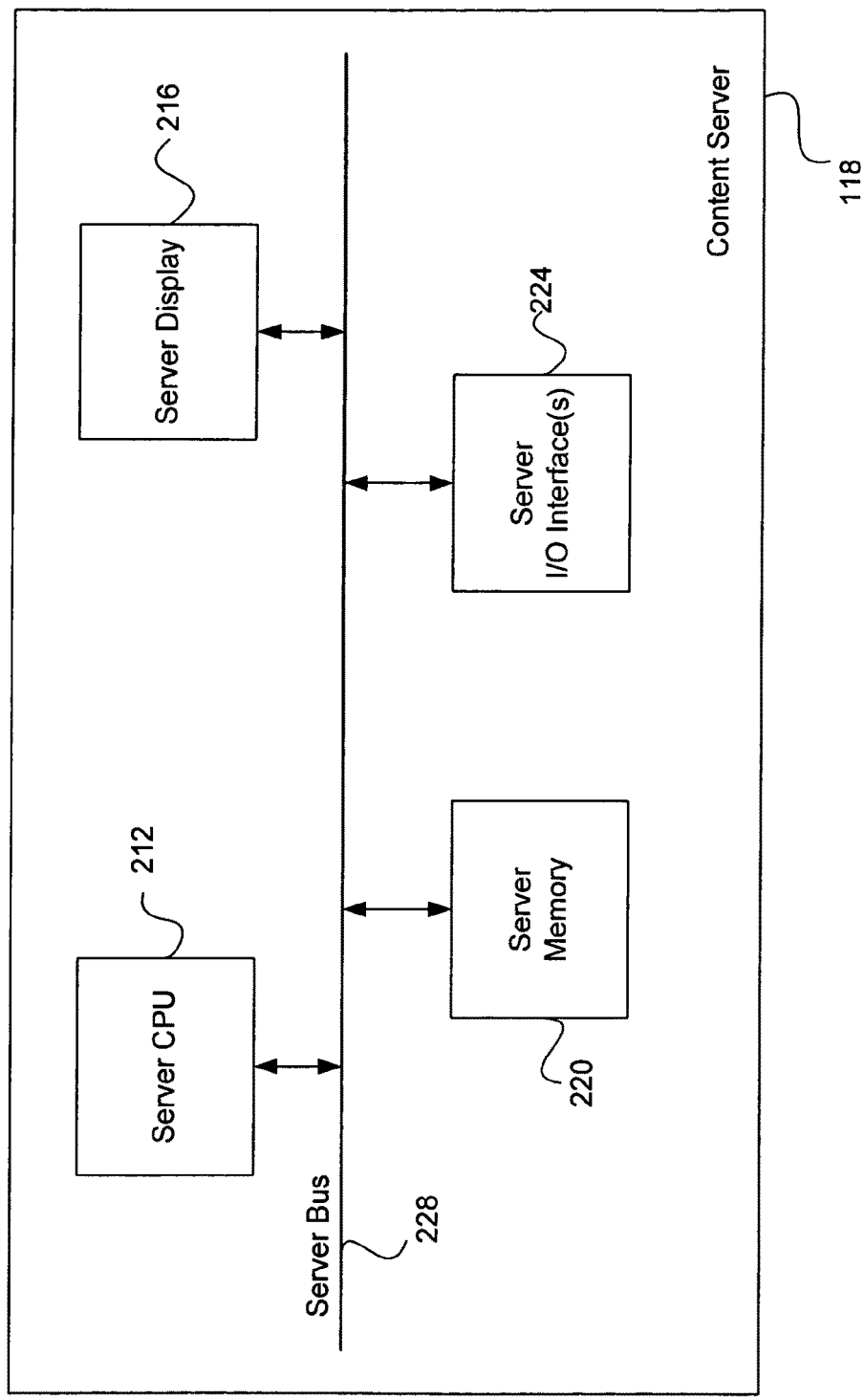
FIG. 2 is a block diagram for one embodiment of the content server of FIG. 1, in accordance with the present invention.

Referring now to FIG. 2, a block diagram for one embodiment of the FIG. 1 content server 118 is shown, in accordance with the present invention. In the FIG. 2 embodiment, content server 118 includes, but is not limited to, a server central processing unit (server CPU) 212, a server display 216, a server memory 220, and one or more server input/output interface(s) (server I/O interface(s)) 224. The foregoing components of content server 118 may be coupled to, and communicate through, a server bus 228. In alternate embodiments, content server 118 may alternately be implemented using components and configurations in addition to, or instead of, certain of those components and configurations discussed in conjunction with the FIG. 2 embodiment. Furthermore, in certain embodiments, there may be multiple instances of content server 118 in content distribution system 110 (FIG. 1).

In the FIG. 2 embodiment, server CPU 212 may be implemented to include any appropriate and compatible microprocessor device that preferably executes software instructions to thereby control and manage the operation of content server 118. The FIG. 2 server display 216 may include any effective type of display technology including a cathode-ray-tube monitor or a liquid-crystal display device with an appropriate screen for displaying various information to a server user. In the FIG. 2 embodiment, server memory 220 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of server memory 220 are further discussed below in conjunction with FIG. 3.

In the FIG. 2 embodiment, server I/O interface(s) 224 may include one or more input and/or output interfaces to receive and/or transmit any required types of information by content server 118. Server I/O interface(s) 224 may include one or more means for allowing a server user to communicate with content server 118. The implementation and utilization of content server 118 is further discussed below in conjunction with FIGS. 3-4 and 10.

Figure 3:
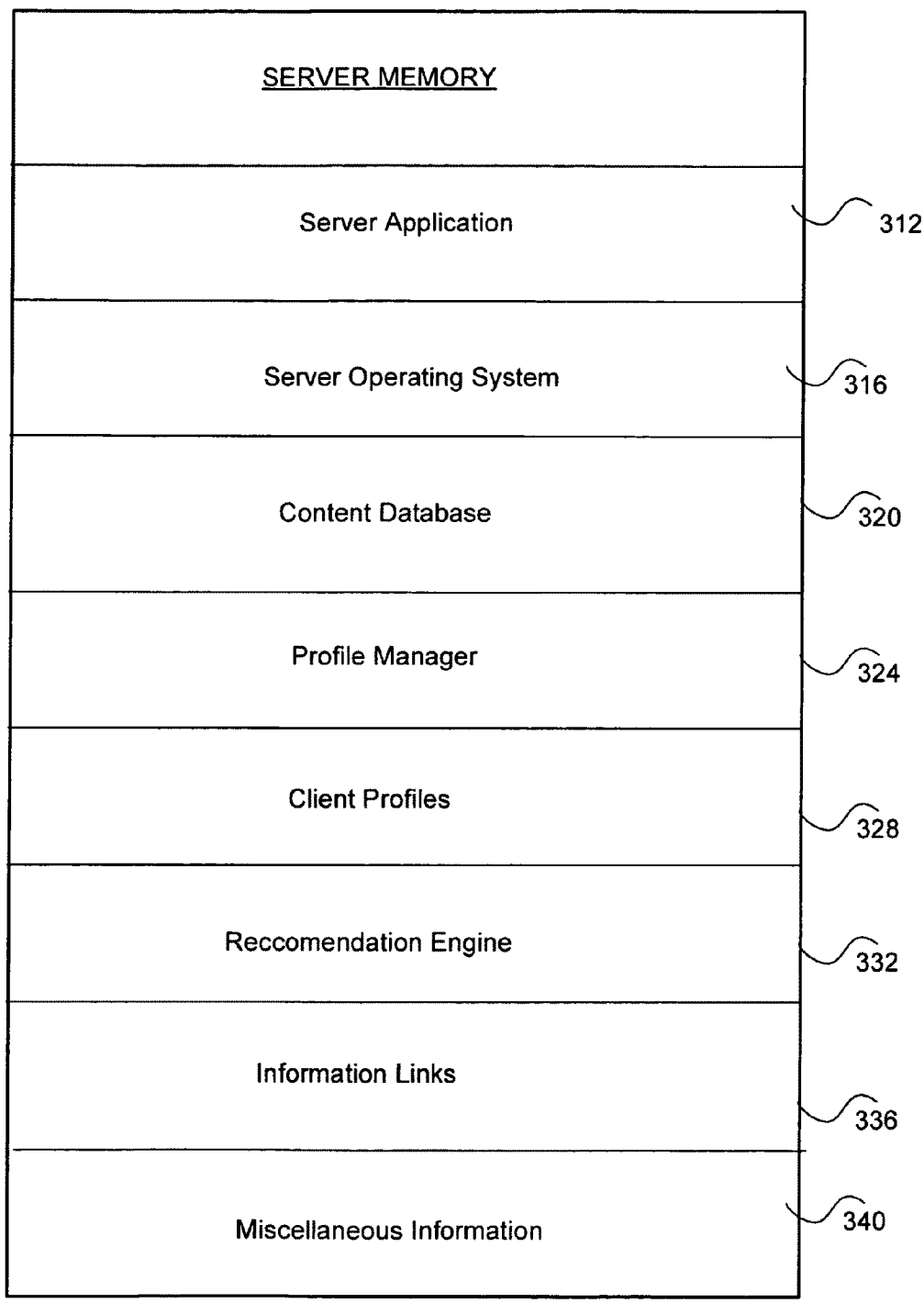
FIG. 3 is a block diagram for one embodiment of the server memory of FIG. 2, in accordance with the present invention.

Referring now to FIG. 3, a block diagram for one embodiment of the FIG. 2 server memory 220 is shown, in accordance with the present invention. In the FIG. 3 embodiment, server memory 220 may include, but is not limited to, a server application 312, a server operating system 316, a content database 320, a profile manager 324, client profiles 328, a recommendation engine 332, information links 336, and miscellaneous information. In alternate embodiments, server memory 220 may include various other components and functionalities in addition to, or instead of, certain those components and functionalities discussed in conjunction with the FIG. 3 embodiment.

In the FIG. 3 embodiment, server application 312 may include program instructions that are preferably executed by server CPU 212 (FIG. 2) to perform various functions and operations for content server 118. The particular nature and functionality of server application 312 typically varies depending upon factors such as the specific type and particular functionality of the corresponding content server 118. Server operating system 316 may perform various low-level functions for content server 118.

In the FIG. 3 embodiment, content database 320 may include any appropriate type of content items or other information received by server application 312 from content provider 114 (FIG. 1) or other appropriate entity. For example, in certain embodiments, content database 320 may include, but is not limited to, any types of entertainment programming, movies, video data, audio data, digital photographs, still image data, graphics, web pages, program guide information, and various types of software programs, etc.

In the FIG. 3 embodiment, profile manager 324 may be utilized to compile and analyze client profiles 328 that each include information corresponding to the client users of respective electronic devices 126 (FIG. 1). In certain embodiments, profile manager 324 may analyze various types of browsing statistics of users of computers 120 in network 114 (FIG. 1) to automatically populate client profiles 328. Alternately, users of computers 120 in network 114 may manually enter appropriate information in corresponding client profiles 328. One embodiment of an exemplary client profile 328 is further discussed below in conjunction with FIG. 7.

In the FIG. 3 embodiment, recommendation engine 332 may be utilized to analyze various types of pre-defined ranking criteria to create recommendation lists for downloading specific appropriate content items from content database 320 to appropriate electronic devices 126. Additional details regarding the operation and implementation of recommendation engine 332 are further discussed below in conjunction with FIGS. 4 and 8. In the FIG. 3 embodiment, information links 336 may include connection information for obtaining other content items in network 114 (FIG. 1). Miscellaneous information 340 may include any appropriate information or data that is required by content server 118.

Figure 4:
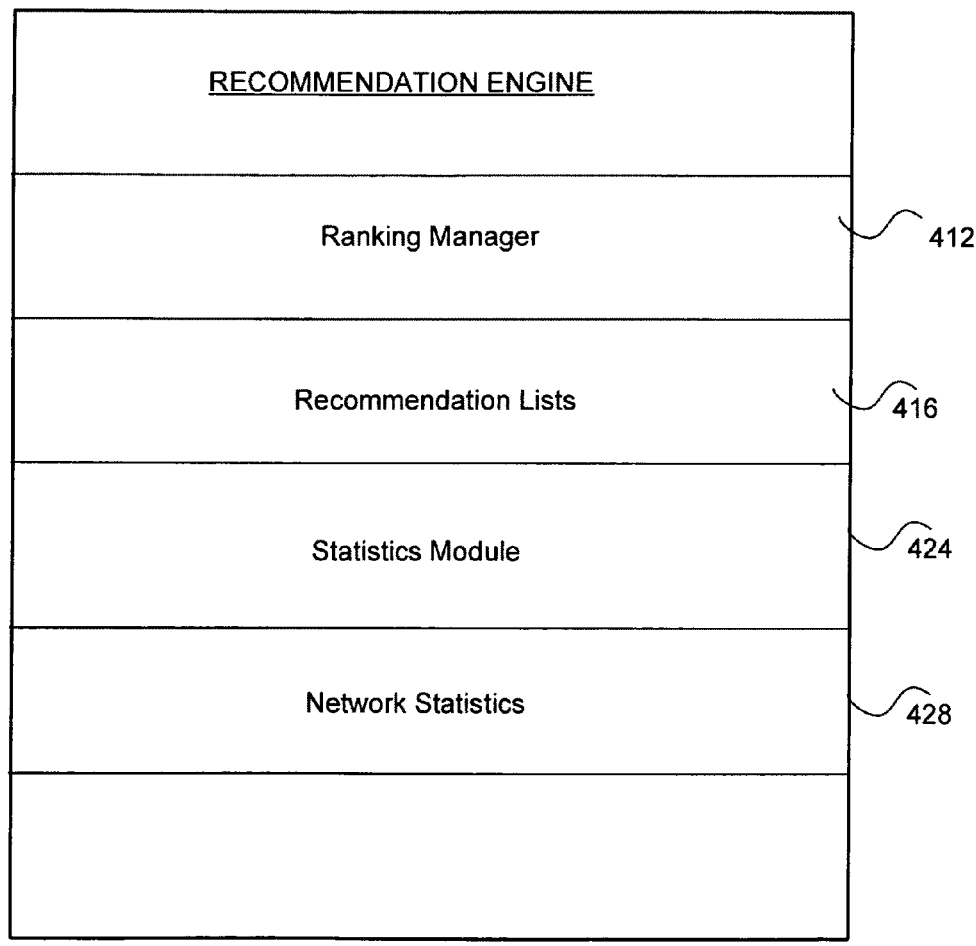
FIG. 4 is a block diagram for one embodiment of the recommendation engine of FIG. 3, in accordance with the present invention.

Referring now to FIG. 4, a diagram for one embodiment of the FIG. 3 recommendation engine 332 is shown, in accordance with the present invention. In the FIG. 4 embodiment, recommendation engine 332 may include, but is not limited to, a ranking manager 412, one or more recommendation lists 416, a statistics module 424, and network statistics 428. In alternate embodiments, recommendation engine 332 may include other elements and configurations in addition to, or instead of, certain of those elements and configurations discussed in conjunction with the FIG. 4 embodiment.

In the FIG. 4 embodiment, recommendation engine 332 may utilize a ranking manager 412 for analyzing various relevant types of pre-defined ranking criteria regarding a device user of a given electronic device 126 (FIG. 1) to thereby generate corresponding one of the recommendation lists 416. For example, ranking manager 412 may generate a recommendation list 416 for a given electronic device 126 by analyzing client attributes from a corresponding client profile 328 (FIG. 3). One embodiment for implementing a recommendation list 416 is further discussed below in conjunction with FIG. 8.

In the FIG. 4 embodiment, recommendation engine 332 may utilize a statistics module 424 for monitoring and compiling network statistics 428 that reflect any appropriate information and characteristics of computers or computer users in network 114 (FIG. 1). For example, network statistics 428 may include any desired type of statistical information regarding Internet browsing habits of computer users in network 114. In the FIG. 4 embodiment, statistics 428 may be collected for each electronic device 126, and may include, but are not limited to, content download frequency, downloaded content types, transferred content titles, and any other relevant statistical transfer patterns or information. The functionality and utilization of recommendation engine 332 are further discussed below in conjunction with FIGS. 8 and 10.

Figure 5:
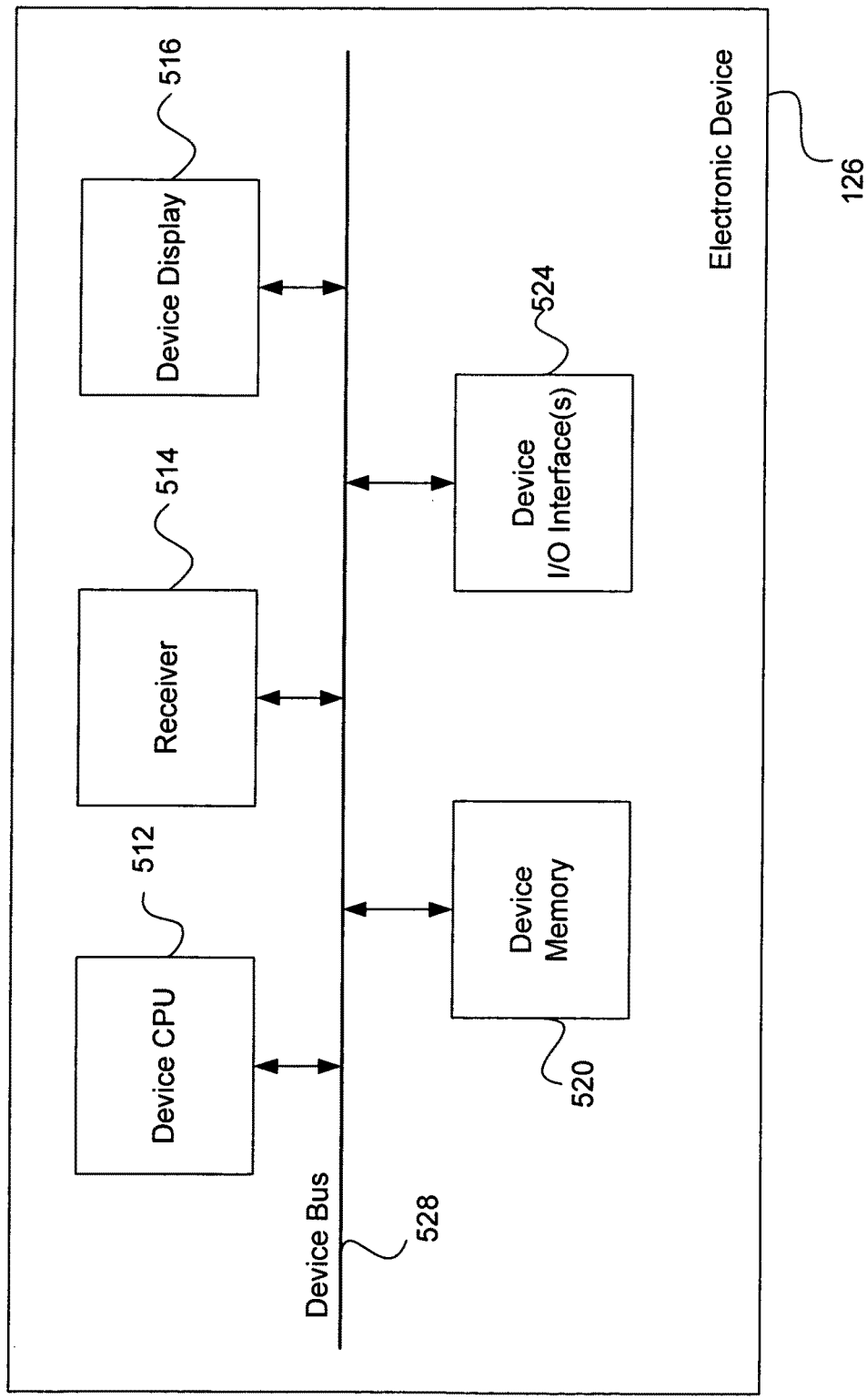
FIG. 5 is a block diagram for one embodiment of the electronic device from FIG. 1, in accordance with the present invention.

Referring now to FIG. 5, a block diagram for one embodiment of the FIG. 1 electronic device 126 is shown, in accordance with the present invention. In the FIG. 5 embodiment, electronic device 126 may include, but is not limited to, a device central processing unit (device CPU) 512, a receiver 514, a device display 516, a device memory 520, and one or more device input/output interface(s) (device I/O interface(s)) 524. The foregoing components of electronic device 126 may be coupled to, and communicate through, a device bus 528.

In alternate embodiments, electronic device 126 may readily be implemented using various components and configurations in addition to, or instead of, certain of those components and configurations discussed in conjunction with the FIG. 5 embodiment. Furthermore, in the FIG. 5 embodiment, electronic device 126 may be implemented as any type of appropriate electronic device. For example, in certain embodiments, electronic device 126 may be implemented as any type of stationary or portable electronic device, such as a personal computer, a cellular telephone, a settop box, an audio-visual entertainment device, or a personal digital assistant (PDA).

In the FIG. 5 embodiment, device CPU 512 may be implemented to include any appropriate and compatible microprocessor device that preferably executes software instructions to thereby control and manage the operation of electronic devices 126. In the FIG. 5 embodiment, receiver 514 may include any appropriate means for receiving content items and other information from transmitter 116 (FIG. 1). In certain embodiments, receiver 514 is economically implemented as a wireless receiver device that does not include a corresponding transmitter device.

The FIG. 5 device display 516 may include any effective type of display technology including a cathode-ray-tube monitor or a liquid-crystal display device with an appropriate screen for displaying various information to a device user. In the FIG. 5 embodiment, device memory 520 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of device memory 520 are further discussed below in conjunction with FIG. 6.

In the FIG. 5 embodiment, device I/O interface(s) 524 may include one or more input and/or output interfaces to receive and/or transmit any required types of information by electronic device 126. Device I/O interface(s) 524 may include one or more means for allowing a device user to communicate with other entities in content distribution system 110 (FIG. 1). For example, the foregoing means may include a keyboard device, a wireless remote-control device, a speech-recognition module with corresponding microphone, a graphical user interface with touch-screen capability, a hand-held device controller unit, or a selection button array mounted externally on electronic device 126. The implementation and utilization of electronic device 126 are further discussed below in conjunction with FIGS. 6 and 11.

Figure 6:
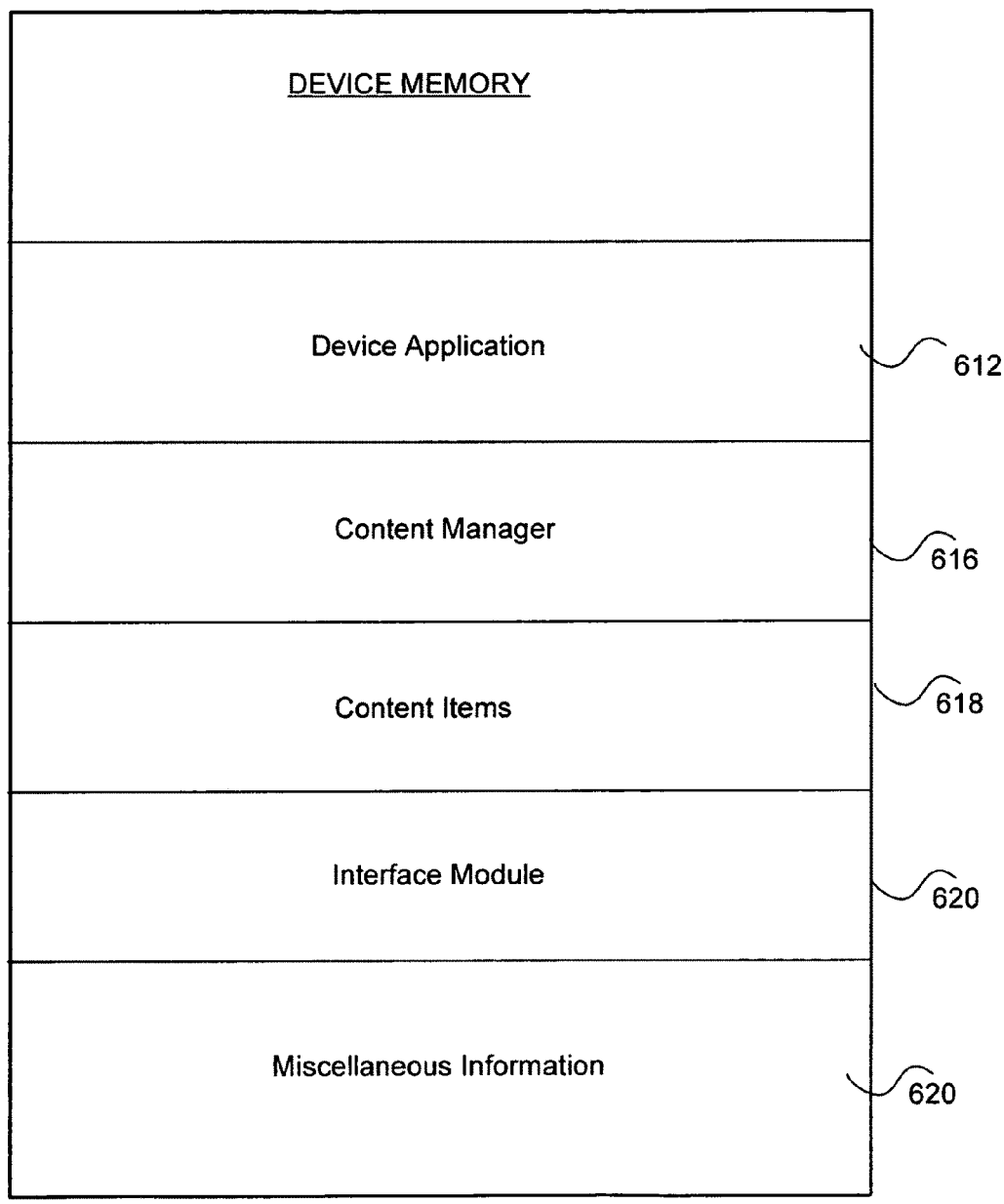
FIG. 6 is a block diagram for one embodiment of the device memory of FIG. 5, in accordance with the present invention.

Referring now to FIG. 6, a block diagram for one embodiment of the FIG. 5 device memory 520 is shown, in accordance with the present invention. In the FIG. 6 embodiment, device memory 520 includes, but is not limited to, a device application 612, a content manager 616, content items 618, an interface module 620, and miscellaneous information. In alternate embodiments, device memory 520 may include various other components and functionalities in addition to, or instead of, certain of those components and functionalities discussed in conjunction with the FIG. 6 embodiment.

In the FIG. 6 embodiment, device application 612 may include program instructions that are preferably executed by a device CPU 512 (FIG. 5) to perform various functions and operations for a electronic device 126. The particular nature and functionality of device application 612 typically varies depending upon factors such as the specific type and particular functionality of the corresponding electronic device 126.

In the FIG. 6 embodiment, content manager 616 may perform appropriate procedures for receiving and managing content items by utilizing any appropriate techniques. For example, content manager may perform content download procedures to automatically receive, evaluate, update, and locally store content items from content server 118 as content items 618. In the FIG. 6 embodiment, interface module 620 may be utilized by a particular electronic device 126 to directly interface and handle different formats of content items 618. The utilization and operation of electronic device 126 is further discussed below in conjunction with FIG. 10.

Figure 7:
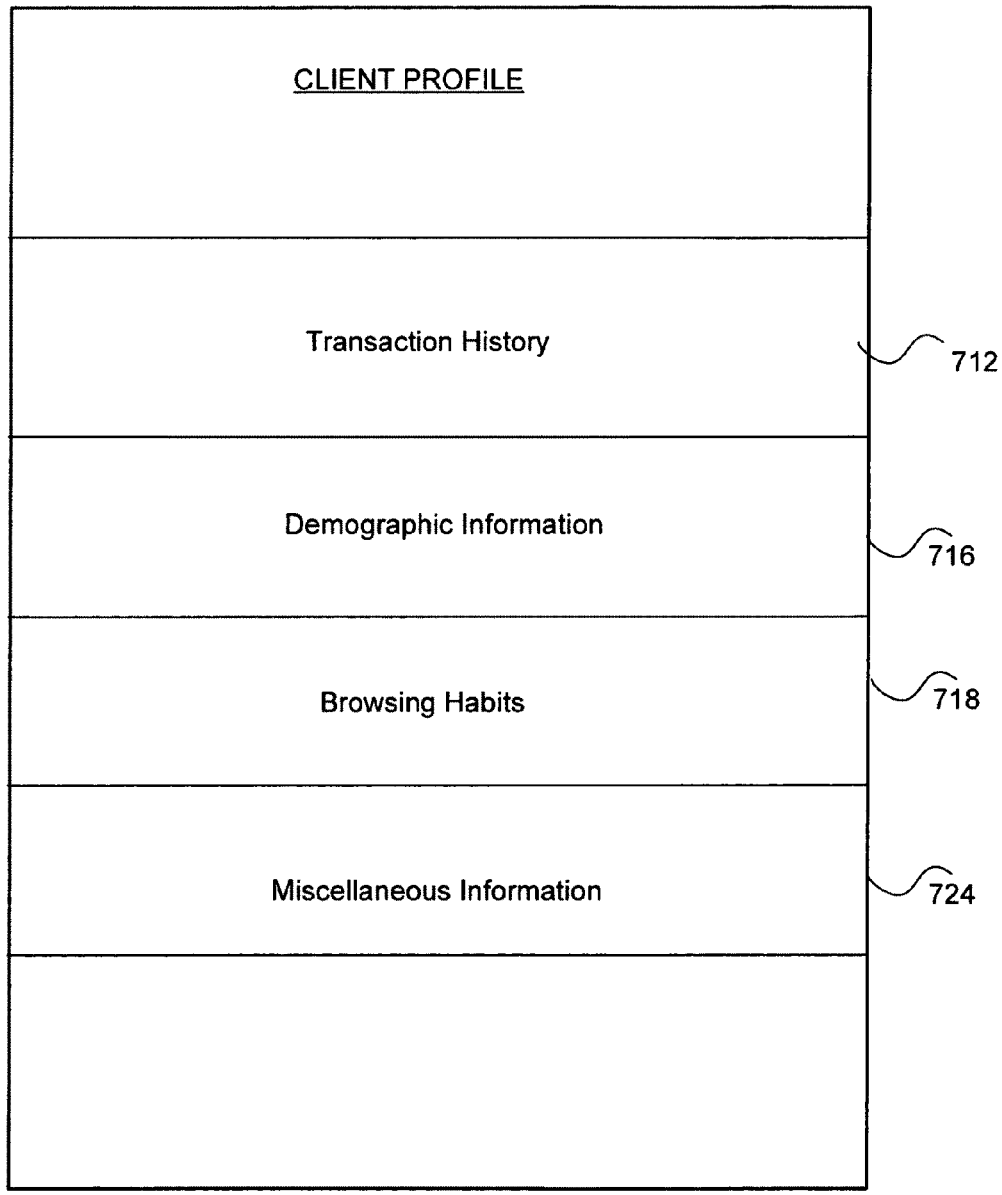
FIG. 7 is a block diagram for one embodiment of a client profile from FIG. 3, in accordance with the present invention.

Referring now to FIG. 7, a block diagram for one embodiment of a FIG. 3 client profile 328 is shown, in accordance with the present invention. In the FIG. 7 embodiment, client profile 328 includes, but is not limited to, a transaction history 712, demographic information 716, browsing habits 718, and miscellaneous information 724. In alternate embodiments, client profile 328 may include other components and information in addition to, or instead of, certain of those components and information discussed in conjunction with the FIG. 7 embodiment.

In the FIG. 7 embodiment, transaction history 712 may include any information about content item downloads from content server 118 to a given electronic device 126. For example, transaction history 712 may include, but is not limited to, content types, content titles, download frequency, download dates, download times, and content price. In addition, the FIG. 7 client profile 328 may include any desired type of demographic information 716 regarding a corresponding device user. For example, demographic information 716 may include, but is not limited to, a client age, a client gender, a client location, a client ethnicity, a client marital status, client family information, a client annual income bracket, a client occupation, client hobbies, client interests, and a client political affiliation.

In the FIG. 7 embodiment, client profile 328 may include any appropriate information regarding the browsing habits 718 of a particular computer user when searching or viewing information on the Internet or other information source via a corresponding computer 120. In the FIG. 7 embodiment, client profile 328 may also include any other desired type of miscellaneous profile information 724. For example, client profile 328 may be implemented to include various types of information about the hardware and/or software configurations and capabilities of a corresponding electronic device 126. Further details regarding the utilization of client profiles 328 are further discussed below in conjunction with FIG. 10.

Figure 8:
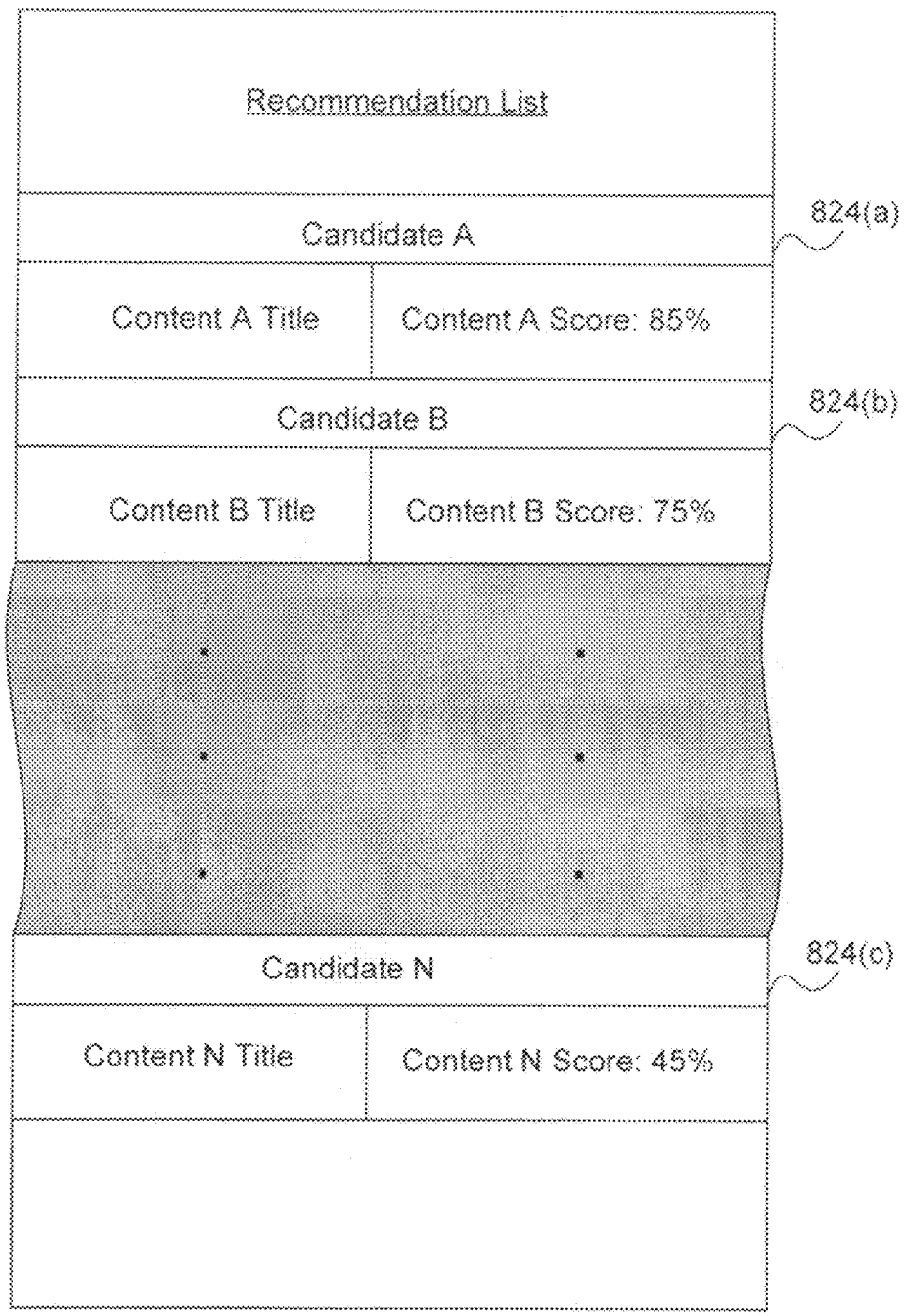
FIG. 8 is a diagram for one embodiment of a recommendation list from FIG. 4, in accordance with the present invention.

Referring now to FIG. 8, a diagram for one embodiment of a FIG. 4 recommendation list 416 is shown, in accordance with the present invention. In the FIG. 8 embodiment, recommendation list 416 includes, but is not limited to, a ranked series of candidates 824 that each represent a different content item from content database 320 of content server 118 (FIG. 1). In alternate embodiments, recommendation list 416 may include other components and information in addition to, or instead of, certain of those components and information discussed in conjunction with the FIG. 8 embodiment.

In the FIG. 8 embodiment, recommendation list 416 includes a candidate A 824(a) through a candidate N 824(c) that each has a corresponding content title and content score. For example, the FIG. 8 candidate A 824(a) includes a content A title and a content A score of 85%. In the FIG. 8 embodiment, candidate A 824(a) is therefore the optimal individual candidate based upon the highest content score. In alternate embodiments, particular content items may be identified by any other appropriate content item designation. For example, content items may be identified by a content identification number. In addition, in certain embodiments, ranking indicators for the transfer candidates 824 may be implemented in any other effective manner. For example, a numerical merit indicator other than a percentage may alternately be utilized.

In the FIG. 8 embodiment, a ranking manager 412 of recommendation engine 332 (FIG. 4) calculates the content scores to generate the ranked individual recommendation list 416 by analyzing any appropriate types of information. For example, ranking manager 412 may generate an individual recommendation list 416 for a given electronic device 126 by analyzing pre-determined ranking criteria that may include device user attributes and electronic device characteristics from a corresponding client profile 328 (FIG. 7).

Furthermore, ranking manager 412 may analyze the pre-determined ranking criteria by utilizing any effective techniques and procedures. For example, in certain embodiments, ranking manager 412 may perform a weighted averaging of the different ranking factors from the ranking criteria to determine a cost function that represents the likelihood of selecting and paying for the downloaded content item by a device user. Each of the various ranking factors may be associated with a different weighting value that represents the approximate significance of the corresponding ranking factor. The generation and utilization of recommendation lists 416 are further discussed below in conjunction with FIG. 10.

Figure 9:
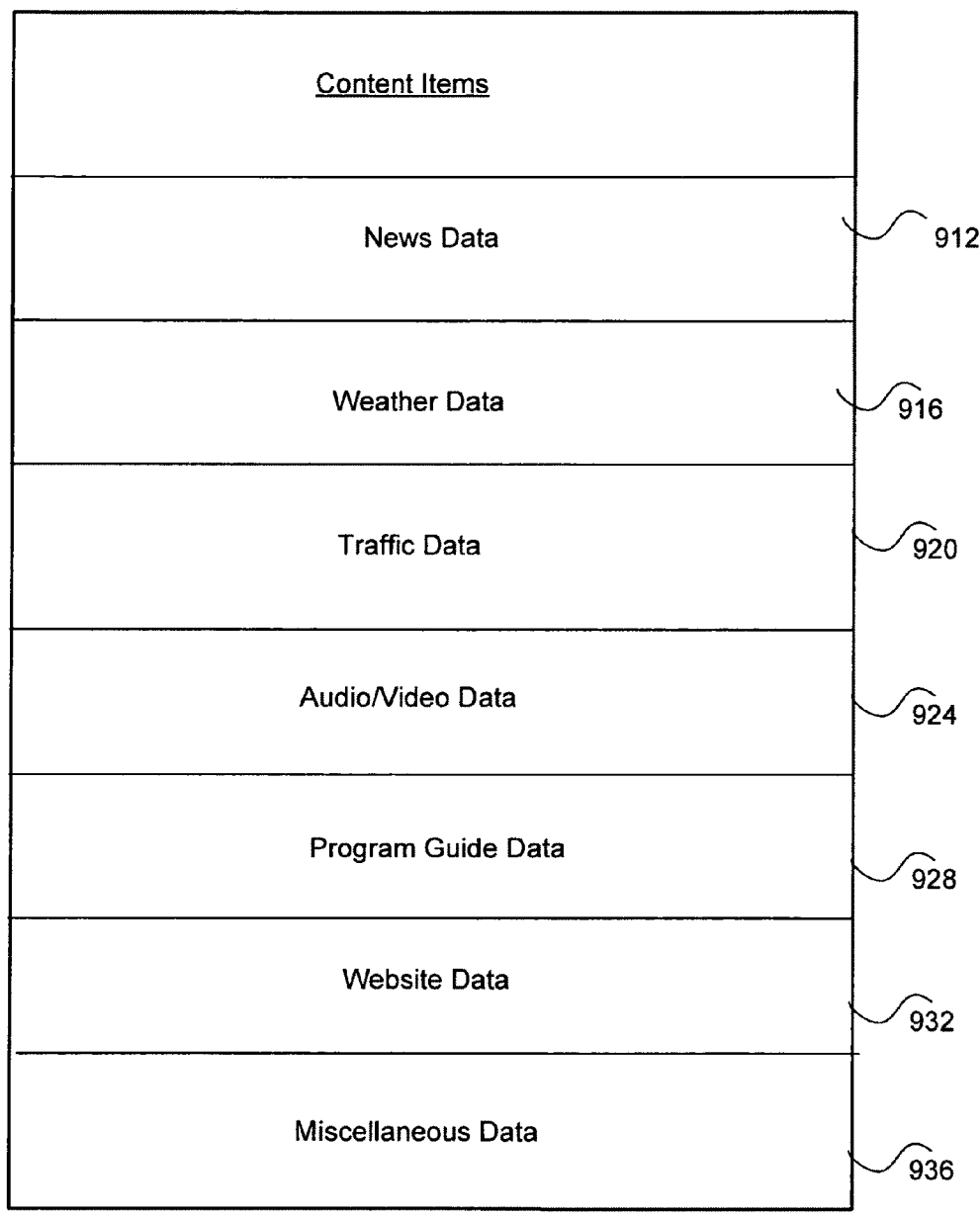
FIG. 9 is a diagram for one embodiment of content items, in accordance with the present invention.

Referring now to FIG. 9, a block diagram for one embodiment of the FIG. 6 content items 618 is shown, in accordance with the present invention. In the FIG. 9 embodiment, content items 618 includes, but is not limited to, news data 912, weather data 916, traffic data 920, audio/video data 924, program guide data 928, website data 932, and miscellaneous data 936. In the FIG. 9 embodiment, content items 618 are presented for purposes of illustration. In alternate embodiments, electronic device 126 may utilize content items 618 that include elements and information in addition to, or instead of, certain of those elements and information discussed in conjunction with the FIG. 9 embodiment.

In the FIG. 9 embodiment, news data 912 may include any appropriate world, regional, or local news information that is provided by content server 118. Similarly, weather data 916 and traffic data 920 may include current information regarding weather and traffic conditions from any specified location. In the FIG. 9 embodiment, audio/video data 924 may include various types of audio and/or video clips. Program guide data 928 may include current information regarding entertainment programming schedules. Website data 932 may include cached copies of Internet websites. Miscellaneous data 936 may include any additional information for utilization by electronic device 126 The transmission and reception of content items 618 is further discussed below in conjunction with FIGS. 10-11.

Figure 10:
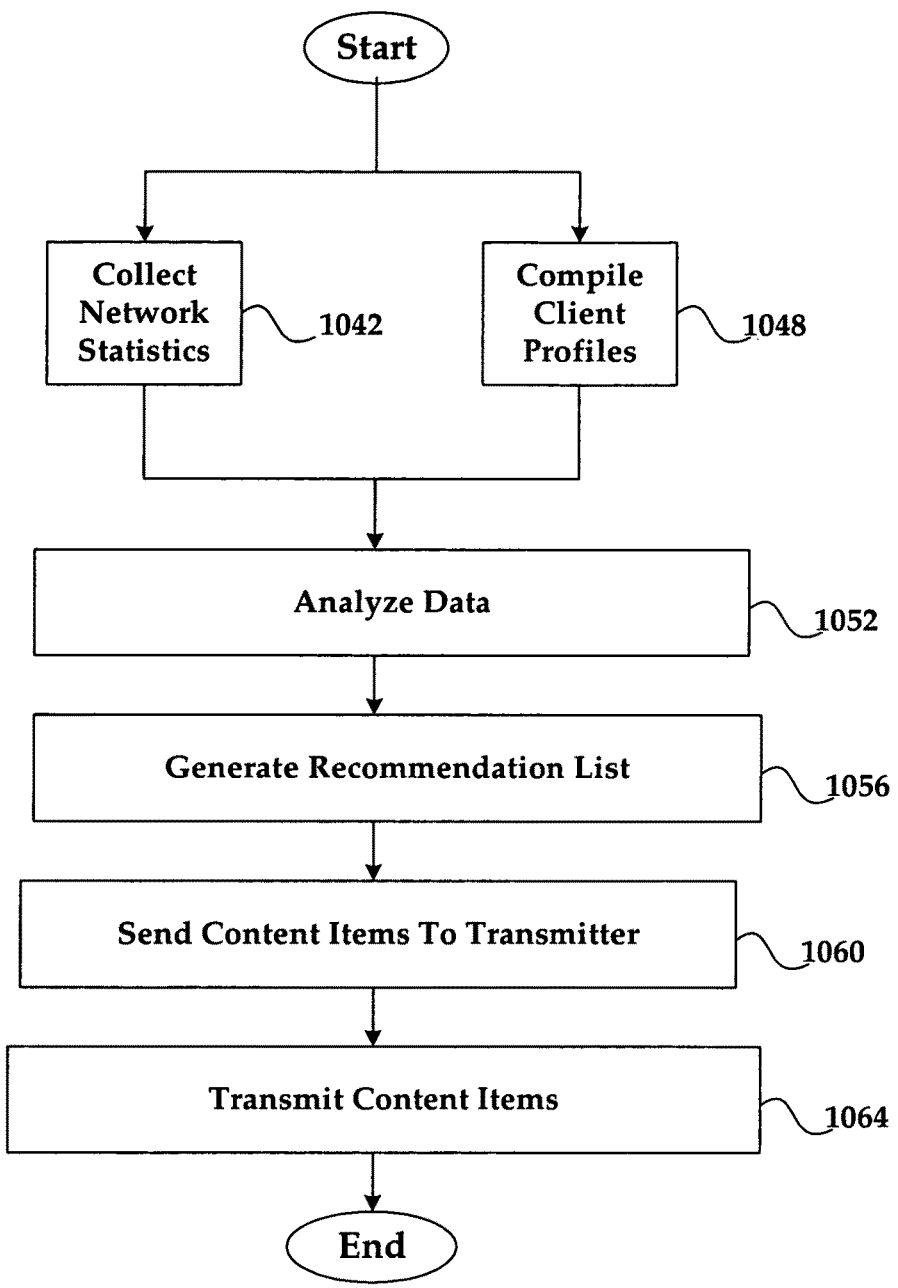
FIG. 10 is a flowchart of method steps for performing a content transmission procedure, in accordance with one embodiment of the present invention.

Referring now to FIG. 10, a flowchart of method steps for performing a content transmission procedure is shown, in accordance with one embodiment of the present invention. The FIG. 10 flowchart is presented for purposes of illustration, and in alternate embodiments, the present invention may utilize steps and sequences other than those steps and sequences discussed in conjunction with the FIG. 10 embodiment.

In the FIG. 10 embodiment, in step 1042, content server 118 collects various specified types of network statistics 428 corresponding to users of computers 120 in an electronic network 114. For example, in certain embodiments, the network statistics 428 may include, but are not limited to, network browsing statistics. In step 1048, content server 118 compiles client profiles 328 corresponding to device users of electronic devices 126 by utilizing any effective techniques. For example, client profiles 328 may include information manually supplied by the device users, and/or content server 118 may automatically populate client profiles 328 by analyzing any appropriate information (including network statistics 428).

In step 1052, a recommendation engine 332 of content server 118 analyzes relevant data (potentially including network statistics 428 and client profiles 328) by utilizing any effective techniques. In step 1056, recommendation engine 332 then generates one or more recommendation lists 416 of appropriate content items 618 to transmit to target ones of the electronic devices 126. In step 1060, content server 118 accesses and sends the recommended content items 618 to a transmitter 116. Finally, in step 1064, transmitter 116 performs a unidirectional broadcast procedure to transmit the received content items 618 to one or more of the electronic devices 126. The FIG. 10 content transmission procedure may then terminate.

Figure 11:
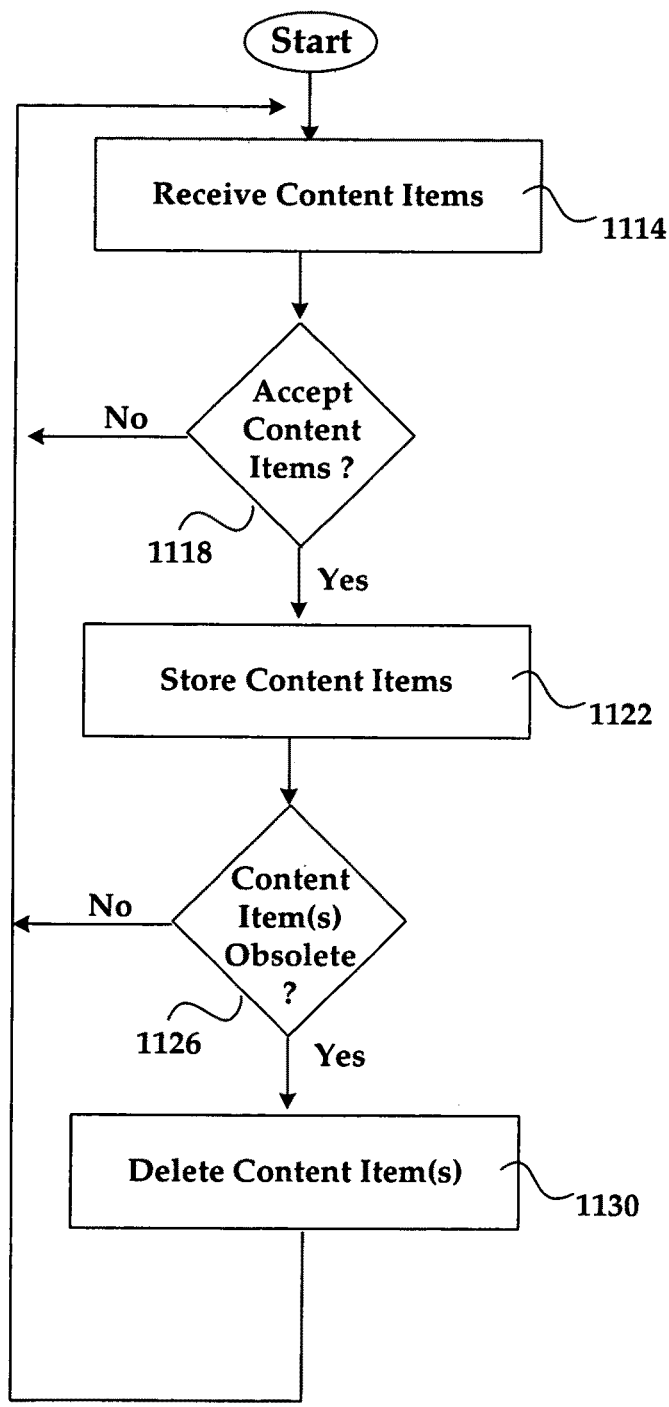
FIG. 11 is a flowchart of method steps for performing a content reception procedure, in accordance with one embodiment of the present invention.

Referring now to FIG. 11, a flowchart of method steps for performing a content reception procedure is shown, in accordance with one embodiment of the present invention. The FIG. 11 flowchart is presented for purposes of illustration, and in alternate embodiments, the present invention may utilize steps and sequences other than those steps and sequences discussed in conjunction with the FIG. 11 embodiment.

In the FIG. 11 embodiment, in step 1114, an electronic device 126 receives content items 618 that were broadcast from a transmitter 116 (FIG. 1). In step 1118, a content manager 616 determines whether to accept the received content items 618 according to any appropriate criteria. For example, a device user may specific certain acceptance criteria by programming corresponding user preferences. If content manager 616 accepts the transmitted content items 618, then in step 1122, content manager 1122 may locally store the content items 618 for appropriate utilization by a device user.

In step 1126, content manager 616 may determine whether one or more stored content items 618 are obsolete or no longer required. In step 1130, content manager 616 automatically deletes any unwanted or out-dated content items 618 from local memory. The FIG. 11 content reception procedure may then return to step 1114 to receive and manage any additional transmitted content items 618. The present invention thus allows a device user to simulate an Internet experience without requiring a bi-directional Internet connection.

In certain embodiments, content manager 616 and an interface manager 620 may enhance user interactivity by providing an information window that catalogues and navigates through currently available content items. Furthermore, if a device user requests certain functionality or content that is not available for any reason, content manager 616 and/or interface manager 620 may intelligently indicate that the user request cannot be serviced, and offer one or more alternatives (such as an older or similar version). For at least the foregoing reasons, the present invention therefore provides an improved system and method for effectively transmitting content items to electronic devices.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for supporting a content distribution procedure, comprising:
   a content server comprising:
      a content database that stores content items and a client profile associated with a user of an electronic device; and
      a recommendation engine operable to:
         analyze network statistics of said user based on usage of computer devices in an electronic network by said user, wherein said electronic device is not one of said computer devices in said electronic network;
         automatically select a content from said content items based on said network statistics and said client profile; and
         transmit said selected content to a transmitter,
            wherein said transmitter automatically broadcasts said content to said electronic device through a unidirectional telecommunication link,
            wherein said electronic device is implemented without a wireless transmission capability.

2. The system of claim 1, wherein said electronic device is a portable wireless device.

3. The system of claim 1, wherein said electronic device comprises a wireless receiver without a transmission capability.

4. The system of claim 1, wherein said content items comprise one or more of: news data, traffic data, weather data, audio/video data, program guide data, and Internet website data.

5. The system of claim 1, wherein said content server comprises said recommendation engine that automatically selects said content for sending to said electronic device.

6. The system of claim 1, wherein said network statistics comprises Internet browsing statistics.

7. The system of claim 1, wherein said client profile is manually created by said user.

8. The system of claim 1, wherein said client profile is automatically created by said content server by analyzing said network statistics.

9. The system of claim 1, wherein said client profile comprises demographic information corresponding to said user.

10. The system of claim 1, wherein said demographic information comprises one or more of: a client age, a client gender, a client location, a client ethnicity, a client marital status, client family information, a client annual income bracket, a client occupation, client hobbies, client interests, and a client political affiliation.

11. The system of claim 1, wherein said transmitter is a radio-frequency television broadcasting transmitter.

12. The system of claim 1, wherein a content manager of said electronic device determines whether to accept said content based upon a content acceptance criteria.

13. The system of claim 12, wherein said content acceptance criteria is manually programmed as a user preference by said user.

14. The system of claim 1, wherein a content manager of said electronic device locally stores said content and determines whether said locally-stored content is obsolete.

15. The system of claim 14, wherein said content manager performs a content update procedure by periodically deleting said obsolete content.

16. The system of claim 1, wherein a content manager of said electronic device presents an information window interface to said user for cataloguing and navigating said content.

17. The system of claim 1, wherein a content manager of said electronic device indicates to said user that requested functionalities are unavailable and wherein said content manager offers said user one or more alternative functionalities.

18. The system of claim 1, further comprising additional electronic devices that each receives different targeted content items on different respective unidirectional transmission channels.

19. A method for supporting a content distribution procedure, comprising:

in a content server:

storing content items and a client profile associated with a user of an electronic device;

analyze network statistics of said user based on usage of computer devices in an electronic network by said user, wherein said electronic device is not one of said computer devices in said electronic network;

selecting a content from said content items by a recommendation engine in said content server based on said network statistics and said client profile; and transmitting said selected content to a transmitter, wherein said transmitter automatically broadcasts said content to said electronic device through a unidirectional telecommunication link, wherein said electronic device is implemented without a wireless transmission capability.

* * * * *